United States Patent [19]
San Miguel

[11] 3,889,463
[45] June 17, 1975

[54] STRESS RELIEVING LINER
[75] Inventor: Anthony San Miguel, Ridgecrest, Calif.
[73] Assignee: The United States of America as represented by the Secretary of the Navy, Washington, D.C.
[22] Filed: June 27, 1974
[21] Appl. No.: 483,595

[52] U.S. Cl. ............... 60/255; 60/200 A; 60/39.47; 102/103; 264/230
[51] Int. Cl. .............................................. F02k 9/04
[58] Field of Search ................. 60/253, 255, 39.47; 102/103; 264/230; 156/85, 86; 204/159.2

[56] References Cited
UNITED STATES PATENTS
3,056,171 10/1962 Fite .................................. 102/103 X
3,673,287 6/1972 Thies et al. ...................... 102/103 X Primary Examiner—William L. Freeh
Assistant Examiner—Robert E. Garrett
Attorney, Agent, or Firm—R. S. Sciascia; Roy Miller; Lloyd E. K. Pohl

[57] ABSTRACT

A stress relieving rocket motor liner is disclosed. The liner comprises an insulator layer joined to an inhibitor layer by means of columns extending through perforations in a release layer and a member polymer layer. The perforated memory polymer layer is outside of and adjacent to the release layer and inside of and adjacent to the insulator layer.

5 Claims, 3 Drawing Figures 3,889,463

STRESS RELIEVING LINER

BACKGROUND OF THE INVENTION

1. Field of Invention

This invention relates to stress relieving liners for rocket motors. More particularly, this invention relates to stress relieving liners for multi-thrust rocket motors.

2. Description of the Prior Art

It is known that one can fashion an excellent stress relieving liner in a rocket motor by first laying down a layer of insulating material adjacent to the motor casing, then placing a perforated sheet of release material (preferably silicone rubber) over the insulating layer and then laying down a layer of inhibitor material over the release material. The inhibitor layer bonds to the insulator layer by means of columns through the release layer and the insulator layer, of course, bonds to the motor casing. After the liner is in place, the propellant grain is cast and binds to the inhibitor layer. The release layer is not bound to anything. A stress relieving liner of this type is disclosed in Assignee's copending application Ser. No. 249,457 filed Apr. 28, 1972.

When an end burning solid propellant grain encased in a liner of the type described above is burned, the outer insulator layer of the liner does not burn but remains in place adjacent to the motor casing performing its job, i.e., insulating the case. The release layer and the inhibitor layer, on the other hand, do burn. However, they burn at a slower rate than the propellant grain. Therefore, during burn, tubes or envelopes of the inhibitor layer and release layer extend rearwardly from the burning end of the propellant grain. As long as there are no great fluctuations in chamber pressure within the rocket motor, these protruding tubes usually do no harm. However, when large fluctuations in pressure occur within the combustion chamber of the rocket motor these protruding tubes do cause problems.

It is theorized that the protruding tubes experience flapping and hence interfere with gas flow and the pressure distribution around the periphery of the suspended grain in the rocket motor. However, whatever the exact mechanism of the problem is, when pressure is suddenly changed within the combustion chamber, for example, by inserting a pintle into the nozzle throat to decrease throat area, the inhibitor layer of the liner seals the periphery cavity between the propellant grain and case. Also the liner is sometimes peeled away from the propellant grain. When either of these events happen, a blow-up occurs.

SUMMARY OF THE INVENTION

It has now been found that the above-described problem can be solved by utilizing a perforated sheet of memory polymer outside of and adjacent to the release layer of the liner. When the propellant grain burns (from the end) the memory polymer, like the inhibitor layer and release layer, burns at a slower rate than the propellant. The memory polymer is attracted to the heat provided by the burning propellant grain and shrinks inwardly holding the release layer and the inhibitor layer close to the propellant grain and, thereby, prevents the inhibitor layer from peeling away from the propellant grain and/or sealing the cavity between the propellant grain and case.

DESCRIPTION OF THE PREFERRED EMBODIMENT

Figure 1:
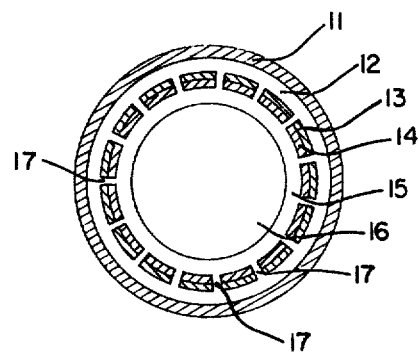
FIG. 1 is a transverse cross-sectional view of a stress relieving rocket motor liner according to this invention.

Going first to the drawing, the numeral 11 is used, in FIG. 1, to indicate a rocket motor casing. Inside the casing is an insulator layer 12. The insulator layer is bonded to the motor casing. According to this invention, the insulator layer may be fabricated from any material commonly used for that purpose. Inside of and adjacent to the insulator layer is a layer of memory polymer 13. The memory polymer layer is perforated and may or may not be bonded to the release layer 14. It is preferably a radiation cross-linked polyolefin such as radiation cross-linked polyethylene. Inside of and adjacent to the layer of memory polymer or surrounding the memory polymer is a release layer 14. The release layer is preferably silicone rubber. Like the layer of memory polymer, it is perforated and does not bond to anything. The perforations correspond or match to the perforations in the memory polymer layer. Inside of and adjacent to the release layer is an inhibitor layer 15. The inhibitor layer is bonded to an end burning solid propellant grain and, by means of columns 17 extending through the release layer and memory polymer layer, is bonded to the insulator layer. Like the insulator layer, the inhibitor layer may be fabricated from any material commonly used for that purpose. The columns 17 may be all inhibitor material, all insulator material or partially inhibitor material and partially insulator material.

The only things required, insofar as selecting the insulator material is concerned, are: (1) that it be a good insulator, i.e., that it does not burn but rather protects the rocket motor casing from heat when the propellant burns, (2) that it be bondable, by means of columns 17, to the inhibitor material and (3) that it be bondable to the motor casing. Many such materials are known to the art and have been used for many years.

The only things required, insofar as selecting the material of the inhibitor layer is concerned, are: (1) that it be bondable to the propellant grain, (2) that it be a good inhibitor and (3) that it be bondable, by means of columns 17, to the insulator material. As in the case of the insulator material, many such materials are known and have been used for many years.

The memory polymer layer and release layer are fully cured when they are placed in the motor during fabrication and, therefore, do not bond to the inhibitor layer, columns, or insulator layer.

Figure 2:
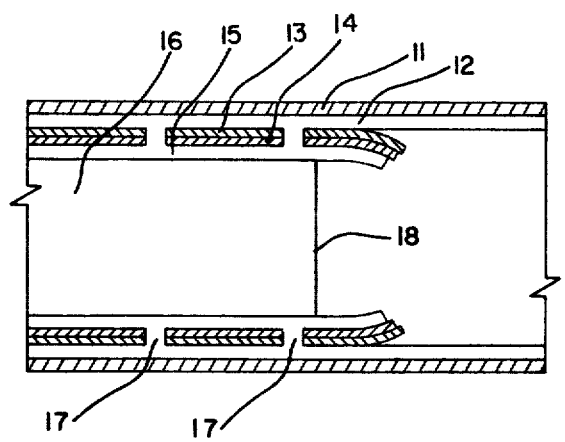
FIG. 2 is longitudinal cross-sectional view of a portion of a rocket motor containing a stress relieving liner according to this invention.

FIG. 2 is a longitudinal cross sectional view of a rocket motor, during burn, in which a liner according to this invention is used. The motor casing is again indicated by the numeral 11. The insulator layer, memory polymer layer, release layer, inhibitor layer and propellant grain are again indicated by the numerals 12, 13, 14, 15 and 16 respectively. Columns are again indicated by the numeral 17.

FIG. 2 is drawn to represent what happens when an end burning solid propellant grain encased in a liner according to this invention burns. The burning end of the propellant grain is indicated by the numeral 18. Extending rearwardly from the burning end of the grain to the rear or nozzle end of the motor (not shown but to the right of FIG. 2) is insulator layer 12. Tubes of memory polymer layer 13, release layer 14 and inhibitor layer 15 also extend to the rear of the burning end of the propellant grain. They, like the propellant grain, are burning but at a slower rate than the propellant grain.

As shown in the drawing, the memory polymer, which is contracted by heat produced by the burning propellant grain, is shrinking inwardly and is holding the release layer and, consequently, the inhibitor layer closely to the propellant grain. This prevents gas from leaking between the propellant grain and inhibitor layer and, consequently, prevents the inhibitor layer from peeling away from the propellant grain. Also prevented is the sealing of the cavity between the propellant grain and motor casing.

As stated above, the preferred material for the memory polymer layer or heat shrinkable layer is radiation cross-linked polyethylene. Other radiation cross-linked polyolefins could be used. For example, radiation cross-linked polypropylene or combinations of radiation cross-linked polyethylene and polypropylene could be used. And other materials could be used. The only criteria in selecting a material for layer 13 are: (1) that it not bond to the insulation layer, (2) that it shrink inwardly when the propellant burns and (3) that, if it burns, it burns more slowly than does the propellant.

As indicated above, a liner according to this invention is particularly useful in cases where an end burning propellant grain is used and where pressure within the combustion chamber of the rocket motor is suddenly changed greatly as it is when a pintle is inserted into the throat area of the nozzle during flight. However, a liner according to this invention is useful with perforated or core burning solid propellant grains as well. It is also suitable for use where no sudden, large fluctuations in pressure occur.

Figure 3:
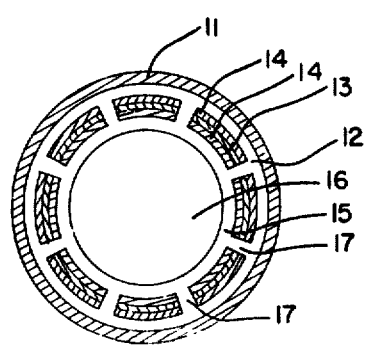
FIG. 3 is a cross-sectional view of one possible composite design configuration in which the memory polymer is embedded within the release layer to enhance contraction force and optimize contraction timing.

FIG. 3 depicts, in cross section, an alternative design which can be used. In FIG. 3, the memory polymer layer 13 is embedded or sandwiched between two layers of release material 14 and 14'. The numerals, with the exception of 14' which is used to indicate a second release layer, are the same in FIG. 3 as they are in FIGS. 1 and 2. By utilizing the memory polymer layer as depicted in FIG. 3 and controlling the thicknesses of release layers 14 and 14', one can optimize contracting time and force for a given application.

What is claimed is:

1. In a stress relieving liner for a rocket motor comprising:
   an insulator layer adjacent to the motor casing and bonded thereto;
   a perforated release layer inside of the insulator layer;
   an inhibitor layer inside of and adjacent to the release layer and columns extending through the perforations in the perforated release layer bonding the insulator layer and inhibitor layer to one another;
   the improvement residing in a perforated layer of heat shrinkable material between and adjacent to the insulator layer and release layer;
   the perforations in said perforated layer of heat shrinkable material corresponding to the perforations in the perforated release layer so that the columns which bond the insulator layer and inhibitor layer together can extend through both the layer of heat shrinkable material and the release layer.

2. In a stress relieving liner according to claim 1:
   the additional improvement residing in utilizing radiation cross-linked polyolefin as the material from which the perforated layer of heat shrinkable material is fabricated.

3. In a stress relieving liner according to claim 2:
   the additional improvement residing in utilizing a member selected from the group consisting of radiation cross-linked polyethylene, radiation cross-linked polypropylene, and combinations thereof as the material from which the perforated layer of heat shrinkable material is fabricated.

4. A stress relieving liner for a rocket motor comprising:
   an insulator layer adjacent to and bonded to the rocket motor casing;
   a first perforated release layer inside of and adjacent to the insulator layer;
   a perforated layer of heat shrinkable material inside of and adjacent to the first perforated release layer;
   a second perforated release layer inside of and adjacent to said perforated layer of heat shrinkable material;
   the perforations in said perforated layer of heat shrinkable material, corresponding to the perforations in the first perforated release layer;
   the perforations in said second perforated release layer corresponding to the perforations in said perforated layer of heat shrinkable material;
   an inhibitor layer inside of and adjacent to said second perforated layer and columns extending through the perforations in said first perforated release layer;
   said perforated layer of heat shrinkable material and said second perforated release layer to bond said insulator layer and said inhibitor layer to each other.

5. A stress relieving liner according to claim 4:
   wherein said perforated layer of heat shrinkable material is a perforated layer of radiation cross-linked polyolefin.

* * * * *